United States Patent [19]

Numakura et al.

[11] Patent Number: 4,833,546

[45] Date of Patent: May 23, 1989

[54] PHOTOMECHANICAL APPARATUS

[75] Inventors: Takashi Numakura; Iwao Numakura, both of Tama; Susumu Kitazawa, Kawasaki, all of Japan

[73] Assignee: Yamatoya & Co., Ltd., Japan

[21] Appl. No.: 167,090

[22] Filed: Mar. 11, 1988

[30] Foreign Application Priority Data

Mar. 11, 1987 [JP] Japan ................................. 62-55831
Mar. 20, 1987 [JP] Japan ................................. 62-67330
Jul. 3, 1987 [JP] Japan ................................. 62-165231

[51] Int. Cl.$^4$ ............................................. H04N 1/21
[52] U.S. Cl. ..................................... 358/283; 358/293
[58] Field of Search ................ 358/280, 282, 283, 298

[56] References Cited

U.S. PATENT DOCUMENTS

| 4,668,996 | 5/1987 | Hatayama | 358/283 |
| 4,680,642 | 7/1987 | Shimamo et al. | 358/283 |
| 4,760,460 | 7/1988 | Shimotohno | 358/283 |
| 4,768,101 | 8/1988 | Webb | 358/283 |

FOREIGN PATENT DOCUMENTS

| 54-97101 | 8/1979 | Japan . |
| 54-98801 | 8/1979 | Japan . |
| 54-103101 | 8/1979 | Japan . |
| 54-115901 | 9/1979 | Japan . |
| 54-115902 | 9/1979 | Japan . |
| 62-11337 | 3/1987 | Japan . |

Primary Examiner—Edward L. Coles, Sr.
Attorney, Agent, or Firm—Lowe, Price, LeBlanc, Becker & Shur

[57] ABSTRACT

Disclosed herein is a photomechanical apparatus suitable for use in the production of a printing plate, which is adapted to print a halftone picture corresponding to an original continuous-tone picture, on the basis of pictorial information signals obtained by photoelectrically scanning the original continuous-tone picture. The photomechanical apparatus is equipped with a tonal conversion system for converting the pictorial information signals in such a way that the base density of a desired control point on the original continuous-tone picture and the halftone intensity of a corresponding control point on the picture to be reproduced are correlated in accordance with a specific conversion formula.

6 Claims, 6 Drawing Sheets (a)

$$y = D_p = y_h + \frac{\alpha(1-10^{-x})}{\alpha - \beta}(y_s - y_h)$$

(b)

$$y = D_o'' = y_h + \frac{\alpha(1-10^{-kx})}{\alpha - \beta}(y_s - y_h)$$

$$D_p = kD_o''$$

PHOTOMECHANICAL APPARATUS

FIELD OF THE INVENTION

This invention relates to a photomechanical apparatus, and more specifically to a photomechanical apparatus equipped with a system for converting pictorial information signals, which have been obtained by photoelectrically scanning an original picture having a continuous tone, in accordance with a novel tonal conversion method and then making a machine plate for a printed picture of a halftone on the basis of signals outputted subsequent to their tonal conversion.

BACKGROUND OF THE INVENTION

In the conventional photomechanical techniques, an original printing film of a halftone picture is formed from an original picture of a continuous tone (primarily, a photographic picture such as photographic monochrome or multicolor picture, photographic positive or negative picture or photographic reflection or transmission picture) by conducting halftone scanning by means of a photomechanical camera or performing both color separation and halftone scanning by means of an advanced photomechanical apparatus such as monochrome scanner, color scanner or total scanner. In a photomechanical process of the above sort, it is the routine practice to inspect and confirm the quality of a picture, which has been formed in an original printing film and is to be printed, by one to several proofs and then to make a final machine plate for printing the picture.

On the other hand, the so-called direct-plate photomechanical process in which the above-mentioned formation and proofs of an original printing film is omitted has found actual utility only in extremely-limited cases, for example, where an original does not contain any continuous-tone picture (for instance, a photographic halftone reflection picture contained in an original is considered to be a sort of line drawing in the present field of art) or in the case of newspapers or the like in which the quality of pictures in the prints may be sacrificed for shortening the time required for the photomechanical plate-making work.

If the direct-plate photomechanical process practised only in extremely-limited fields as described above is applied to an original which contains one or more photographic continuous-tone pictures and is to be printed (incidentally, such an original usually contains one or more photographic continuous-tone pictures), it is extremely difficult to stably produce generally-acceptable standard.

Except for the extremely-limited cases mentioned above, the direct-plate photomechanical process has therefore not been recognized as one of photomechanical processes.

Namely, the formation of an original printing film and the step of proof are indispensable without exception for all photomechanical processes known to date, so that they cannot not be omitted.

The present inventors have heretofore made various proposals with a view toward improving the present direct-plate photomechanical process into a rational technical system applicable to an original which contains one or more usual photographic continuous-tone pictures. Namely, the present inventors have reviewed all steps, basic work, fundamental techniques and technical system involved in the overall process for forming from an original picture a picture to be printed, and have made various proposals in order to errors and defects included therein. For example, the present inventors proposed to improve the quality evaluation of a printed picture (i.e., to measure and control the two basic elements forming a printed picture "the size of each dot " and "the density of each printing ink" independently). Also proposed were the tone-rendering-first-ism and 4-point control method in the conversion of a picture, both, for the rationalization of color separation work (i.e., the present inventors proposed to include, as control points, at least four areas of H (the brightest point in the high-light area), S (the darkest part in the shadow area), $M_1$ (intermediate density point of the picture) and $M_2$ (the position where 50% dot area percentage is set). The present inventors also proposed to improve the system of an advanced photomechanical apparatus by using these techniques. Regarding these proposals, reference may be had, for example, to Japanese Paten Laid-Open Nos. 97101/1979, 98801/1979, 103101/1979, 115901/1979 and 115902/1979 and Japanese Patent Publication No. 11337/1987.

It was however unable to standardize, rationalize and systemtize the photomechanical technology to such an extent that the formation of an original printing film and proofing step mentioned above could be omitted in the photomechanical work.

It is however of urgent necessity for the present field of art to establish a direct-plate photomechanical technique which can substantially omit the above-described formation of a original printing film and proofing step and can also obtain printed pictures of stable quality.

The problem sought for solution in the present invention is concerned with the non-rational and non-scientific means applied to date for the conversion of the tone of a picture, namely, employed in the work for converting a continuous-tone picture into a halftone picture.

With a view toward establishing a direct-plate photomechanical technique also applicable to an original continuous-tone picture, the individual steps and work of the photomechanical process, the fundamental techniques applied to such steps and work, and the overall technical system of the process were studied in detail. As a result, the lack of establishment of the above-mentioned direct-plate photomechanical process by that time was found to be attributable to the fact that the tonal conversion of a picture, which is the first step of a process for forming a halftone picture to be printed from an original continuous-tone picture and is also the most important and basic step in color separation or the like, was dependent on non-scientific and non-rational means.

The present inventors then reached a belief that the establishment of a reliable direct-plate photomechanical technique would be difficult unless the above problem was solved.

Incidentally, the present tonal conversion for converting an original continuous-tone picture into a halftone picture to be printed is still performed on the basis of the experiences of perception of men such as designers of a photomechanical apparatus such as color scanner or its users or depending on a plurality of fixed given data. The tonal conversion is hence non-scientific and non-rational and lacks operational flexibility.

Incidentally, a standard work characteristic curve is employed as a standard or reference when a tonal conversion is effected by performing halftone scanning or both color separation and halftone scanning with advanced photomechanical equipment such as monochrome scanner or color scanner. This standard work characteristic curve is a characteristic curve of a halftone picture, which is to be used as a standard or reference upon performing halftone scanning or color separation. It is also called "a color-separation density characteristic curve", "a color-separation characteristic curve", "a halftone characteristic curve" or the like. As such a standard work characteristic curve, is used that determined by the manufacturer on the basis of its experiences and perception or information based on a limited number of fixed given conditions and stored in a memory of such an apparatus.

For the operator of the apparatus, the details and number of technical and operational choices in the photomechanical work have already been limited due to the non-rational and non-scientific knowledge of the design engineers of the apparatus. A limitation has also been imposed on the details and range of technical and operational measures for advanced and varied needs of the society for printed pictures and for nonstandard original pictures (pictures of color originals having quality other than the color original quality taken into consideration by the designers of photomechanical apparatus). Otherwise, the conversion of the tone of a picture is performed primarily on the basis of the experiences and perception of an operator.

Such apparatus include those designed in such a way that an operator sets a work standard characteristic curve as desired, scores it in a memory thereof and then uses same as needed. This procedure however requires complex basic experiments and is cumbersome work which requires a lot of time, labor and cost. Nevertheless, the new work standard characteristic curve cannot be set rationally and scientifically beyond the aforementioned boundary of the fundamental limitation. In the present state of the art, there are more and more cases in which a work standard characteristic curve must be set newly in a rational and scientific manner beyond the boundary of the fundamental limitation.

As has been described above, the present inventors have a view that the present advanced photomechanical apparatus such as monochrome scanners and color scanners basically do not make full use of the necessary and sufficient finding and knowledge on plate-making and printing, their design technology is composed of the theory of color separation based on the non-rational and non-systematic, photographic masking method, and the various improvements to the apparatus were basically only counter-measures based on the theory of color separation.

The present inventors have hence carried out an extensive investigation under the basic recognition that a technical means always capable of assuring the quality of a picture to be printed, namely, a rational and scientific technique for the tonal conversion of a picture has to be established in place of the conventional photomechanical process in order to establish a direct-plate photomechanical technique useful for the eternal rationalization of the photomechanical technology and its practice.

In the conventional design technology of scanners, color correction and color modification were given the priority and the tonal conversion of a picture was taken into secondary consideration, as described above, upon performing tonal conversion of a photographic original picture into a halftone picture in color separation work. In the tonal conversion of a picture, the conventional design technology has hence stuck with the 3-point control method which regards sufficient the control of the three points H, S and $M_1$ without paying any attention to the control of the position where 50% dot area percentage required for the stabilization and improvement of the quality of a picture to be printed and for the conversion and control of gray balance of an intermediate tone. It is also the present state of the art that no sufficient consideration is give regarding how big effects a slightest change in area of each dot gives to the change in gradation and tone of a printed picture which is an assembly of numerous dots, although the development of such effects is an extremely important finding for plate-making and printing. The essential elements for expressing or visualizing a printed halftone picture, in which the control of the position for setting 50% dot area percentage and the control of the dot area are also neglected for the above-mentioned reason, are both "the area of each dot" and "the reflection density of an ink". As to the factor of the above-described "reflection density of the ink", the amount of an ink may be controlled within about ±20% in the case of Y, M and C (about ±40% in the case of a black plate) on a printing machine. Further, the visual sensation of a man has ability to easily distinguish as a density difference the difference of 1% in terms of "dot area" percentage. It is hence understood that the control of the area of each dot is extremely important in the formation or conversion of a halftone picture, when the above objective facts are taken into parallel consideration. It is therefore understood that when a conventional color separation technique is relied upon, a significant limitation lies as an obstacle to the theme of obtaining a printed picture having extremely high fidelity from an original picture such as photographic color picture.

In the conventional tonal conversion method of an original continuous-tone picture into a halftone picture to be printed, there was no means for correlating rationally and eternally the density at a desired control point on the continuous-tone picture with the dot area percentage of the dot at its corresponding control point on the halftone picture.

The present inventors have carried out an extensive investigation with a view toward breaking up the above-mentioned limitation of the conventional tonal conversion techniques which are non-rational and non-scientific. As a result, the present inventors have found a novel tonal conversion method for correlating the base density of a control point on the aforementioned original continuous-tone picture with the dot area percentage at the corresponding control point on the halftone picture. It has then been found that the novel, rational and scientific, tonal conversion method can be successfully applied to conventional photomechanical apparatus, can break up the limitation of the conventional color separation technology and can exhibit superb effects, leading to the completion of the present invention.

SUMMARY OF HE INVENTION

In summary, the present invention relates to a photomechanical apparatus suitable for use in the production of a printing plate, which is adapted to print a halftone picture corresponding to an original continuous-tone picture, on the basis of pictorial information signals obtained by photo-electrically scanning the original continuous-tone picture. The apparatus comprises a tonal conversion system for converting the pictorial information signals in such a way that the base density (x) of a desired control point on the original continuous-tone picture and the halftone intensity (y) of a corresponding control point on the picture to be reproduced are correlated in accordance with the following formula (1):

$$y = y_h + \frac{a(1 - 10^{-kx})}{a - \beta}(y_s - y_h) \quad (1)$$

where x: the base density of the desired control point on the original continuous-tone picture, namely, a value obtained by subtracting the density at the brightest area of the original continuous-tone picture from the density at the desired control point of the original continuous-tone picture;

y: the halftone intensity of the corresponding control point on the picture to be reproduced;

$y_h$: a desired halftone intensity set for the brightest area of the picture to be reproduced;

$y_s$: a desired halftone intensity set for the darkest area of the picture to be reproduced;

$a$: the reflectivity of a base material on which the halftone picture is to be reproduced;

$\beta$: the surface reflectivity of a medium for visualizing the halftone picture; and k: the ratio of the density range of the halftone picture to be reproduced to the density range of the original continuous-tone picture.

DETAILED DESCRIPTION OF THE INVENTION

Figure 1:
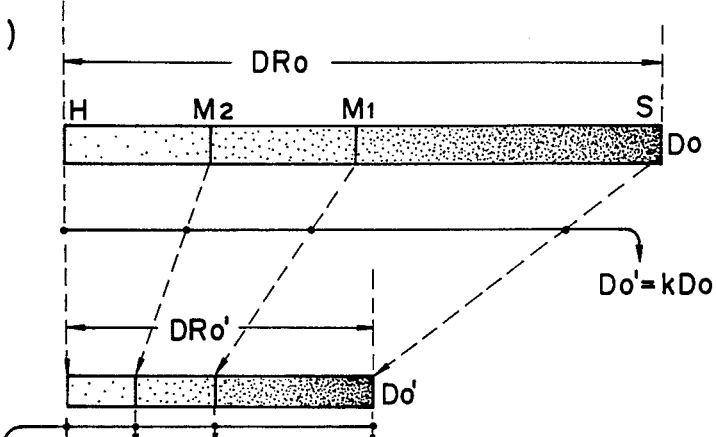
FIG. 1(a) is a schematic illustration showing a tonal conversion method in the present invention, which converts an original continuous-tone picture into a halftone picture via an intermediate picture compressed in density.
FIG. 1(b) is a schematic illustration showing another tonal conversion in this invention, which converts the original continuous-tone picture into a halftone picture via an intermediate picture compressed in density range.
Figure 1:
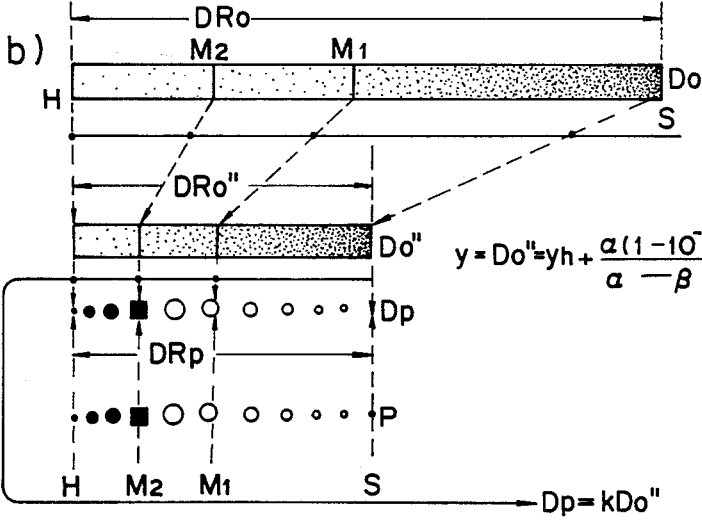

First of all, a description will be made of a tonal conversion method which constitutes a basis in the photomechanical apparatus of this invention and is adapted to obtain from an original continuous-tone picture a halftone picture to be printed.

The following objective facts and empirical rules have been known with respect to a printed picture, namely, a halftone picture. Namely, there are two basic elements for expressing or visualizing the printed picture, i.e., "dot areas" and "the reflection density of an ink". Regarding the factor of "the reflection density of the ink", the amount of the ink which may be changed on a printing machine may be about 20%, more specifically, about 20% (within about ±10% based on an appropriate ink amount) in the case of Y, M and C plates of color printing plates, and about 40% (similarly, about ±20%) in the case of a BL (black) plate. Empirically, it has been known that the visual sensation of a man can easily distinguish a difference as small as 1% between "dot area" percentages as a density difference. It is hence appreciated that the control of each dot area is extremely important and must be the most important matter in the formation of a halftone picture. In relation to the matter mentioned above, photomechanical plate-making work involves the following background characteristics. Namely, original pictures have a wide variety of quality and details. The step for the formation of a printed picture, which follows the photomechanical plate-making work, is diversified and moreover, each of such diversified kinds of printed-picture forming steps has its own work characteristics. Furthermore, the quality evaluation standard for printed pictures varies from one orderer for prints to another. In order to overcome such complex and unstable factors, it is therefore essential to provide a rational and simple, tonal conversion means for allowing the tones, said tones ranging from the brightest area to the darkest area, of the two pictures correspond to correspond at 1:1 to each other upon conversion of an original continuous-tone picture into a halftone picture while allowing to freely choose the smallest dot ($Y_h$) at the brightest area and the largest dot ($Y_s$) at the darkest area in a halftone picture to be produced.

It is the tonal conversion method defined by the conversion formula (1) that has been created and devised in light of such an approach and is applied to the tonal conversion system of the photomechanical apparatus of this invention. The method may hereinafter be called "the present conversion method".

The tonal conversion method defined by the conversion formula (1) is practised to determine the value (y) of the dot area percentage of the dot at a control point (Y) on a picture, which is to be printed, from the base density (x) of a corresponding control point (X) on an original picture while freely selecting the sizes of dots desired to be placed in the highlight area H and shadow area S of the picture, which is to be printed, on the basis of the reflection densities of printing paper and printing ink. The measurement of these densities is generally performed by using a color densitometer (transmission type, reflection type, dedicated type, shared type, or the like). When a scanner is used, they may be measured by a density measurement device which the scanner is equipped with.

The above-described conversion formula (1), which is useful in determining dot area percentages (y), was derived from the density formula (photographic density, optical density) accepted widely, namely, $$D = \log I_0/I = \log 1/T$$

where $I_0$: intensity of incident light,

I: intensity of light reflected or transmitted, and $T = I/I_0 =$ reflectivity or transmittance.

The above general formula for the density D may be applied to plate-making and printing in the following manner.

Density ($D'$) in plate-making and printing = $\log I_0/I =$ log (unit are × reflectivity of paper)/{(unit area − dot area) × reflectivity of paper + dot area × surface reflectivity of ink} =
log $aA/[a\{A - (d_1 + d_2 + \ldots + d_n)\} +$ -continued $$\beta(d_1 + d_2 + \ldots d_n)]$$

where
- A: the unit area,
- $d_n$: the area of each dot in the unit area,
- $\alpha$: the reflectivity of the printing paper, and
- $\beta$: the surface reflectivity of the printing ink.

In the present invention, the density formula (D') for plate-making and printing was incorporated with the above-described requirement for the maintenance of correlation between the base density (x) at a desired control point on a continuous-tone picture and the dot area percentage (y) of the dot at the corresponding control point on a resulting halftone picture, whereby the conversion formula (1) has been derived so as to bring a theoretical value into substantial conformity with its corresponding value measure actually.

The greatest merits of the tonal conversion method defined by the conversion formula (1), which is performed by a tonal conversion system provided with the photomechanical apparatus of this invention and adapted to process pictorial information signals, are that the base density (x) at a desired control point (X) on a continuous-tone picture can be converted into the value (y) of the dot area percentage of the dot at the corresponding control point (Y) on the corresponding halftone picture while selecting the value ($y_h$) of the dot area percentage of the smallest dot at the brightest area and the value ($y_s$) of the dot area percentage of the largest dot of the darkest area in the printed halftone picture and the values $\alpha$ and $\beta$, it is hence possible to know with extreme ease which characteristics the halftone characteristic curve is supposed to have in a halftone picture that a worker wants to form, and the quality of a picture to be printed is always assured and a picture of quality intended beforehand, which is to be printed, can be formed directly on a machine plate.

The tonal conversion method which is practised by the photomechanical apparatus of this invention and is defined by the conversion formula (1) permits the selection of suitable $y_h$, $y_s$, $\alpha$ and $\beta$ as desired. In addition, where the density range of an original continuous-tone picture such a photographic color picture is different from the density range of a printed halftone picture, it is only necessary to conduct the tonal conversion of the picture by using a compression method known very well in the present field of art, namely, by suitably choosing the k value which is the ratio of the concentration range of the picture to be printed to the density range of the original picture.

The photomechanical apparatus of this invention is equipped with a system which performs the tonal conversion of pictorial information signals. "The present conversion method", which is practised in the tonal conversion system of the photomechanical apparatus of this invention, can conduct the tonal conversion, modification or change of a picture by changing $y_h$, $y_s$, k value, $\alpha/(\alpha-\beta)$=value $\epsilon$ suitably and therefore has an extremely high degree of flexibility. In this regard, a user (worker) should keep in mind that "the present conversion method" defined by the conversion formula (1) has the following freedom upon its application.

Freedom 1

The conversion formula (1) can be used to obtain a printed picture conforming its corresponding original picture very well. Namely, the conversion formula (1) can be applied while giving the priority to the provision of a printed picture which looks exactly the same as the original picture to the eyes of a man. Such a manner is described by the term "tonal conversion" in this invention.

Freedom 2

The conversion formula (1) can be used to change or modify an original picture in light of needs from the viewpoint of photomechanical plate-making and printing techniques, artistic demands, orderers' needs, etc. Namely, the conversion formula (1) can be applied in such a way that a picture as observed through the eyes of a man itself is modified or changed. Such a manner is described by terms "tonal modification (or change)" in this invention.

The above-mentioned tonal conversion or tonal modification (or change) can be carried out by changing the $y_h$, $y_s$, k value and $\epsilon$ value suitably in the conversion formula (1).

"The present modification method" defined by the conversion formula (1) can be practised by various apparatus capable of performing a photomechanical process while processing pictorial information signals of an original and conducting the tonal conversion and/or tonal modification (change) of the picture, for example, photomechanical apparatus such as monochrome scanners and color scanners and pictorial information processing apparatus having analogous purpose, function and construction.

By allowing the tonal conversion system for pictorial information signals to perform "the conversion method" of this invention in the above described manner, it is possible to get rid of the conventional tonal control method which relies upon experiences and perception, and hence to perform the conversion of gradation (hence, tonal conversion) of a picture rationally and suitably as desired while always assuring the quality of the picture.

In the case of multi-color plate-making (the four plates, namely, cyan plate, magenta plate, yellow plate and black plate are generally considered to make up a unit), once the standard work characteristic curve, namely, the standard halftone characteristic curve of a base plate [in the case of multi-color plate-making, the cyan plate serves as a base plate as known very well in the art] is determined, the standard work characteristic curves of the other color plates can always be determined rationally by multiplying the value y of the base plate with appropriate conversion values which are based respectively on the gray balance ratios of the corresponding individual printing inks on the basis of results of a printing test. Moreover, all of the work characteristic standard curves thus determined for the individual color plates are of course rational characteristic curves and moreover, the mutual relationship in gradation and tone among these characteristic curves is also rational and appropriate. So long as the tonal conversion of a picture is conducted in accordance with "the present conversion method", the conversion and modification (change) of the gradation of a picture to be printed in accordance with a multi-color printing technique can be effected rationally while assuring the quality of the picture to be printed.

When the tonal conversion of a picture is performed by "the present conversion method" at the tonal conversion system of the photomechanical apparatus of this invention, no jumping (the gradation or tone becomes discontinuous in a halftone picture) occurs in gradation on a printed picture to be obtained. In order to rationalize the conversion and control of a work standard characteristic curve further in response to a technical demand in the photomechanical process, the position and number of control points may be concentrated easily, for example, around 50% dot area percentage as desired. This indicates the usefulness of this invention for the solution of various problems pertaining the tonal conversion and modification (change) of an intermediate tone, such that it is difficult to achieve the gray balance (density balance) of an intermediate tone (which means a halftone area, whose dot area percentage ranges from about 40% to about 80% on a print) in spite of today's wide-spread adoption of advance photomechanical apparatus, the color of the intermediate tone is dull and does not have any vivid tone, it is difficult to emphasize or stress the intermediate tone (which is of course related closely to the gradation and tone of the entire pattern), and the delicate gradation of the intermediate tone cannot be reproduced well.

Although the photomechanical apparatus of the present invention is intended to form a machine plate directly as described above, it is not excluded to form an original printing film or to proof in order to control the quality of a picture to be printed.

Furthermore, no limitation is imposed on the kind or type of the plate material and the plate-making method, so long as a machine plate can be formed. No limitation is imposed either on the means or method for utilizing output signals obtained from a photo-mechanical apparatus such as scanner.

In order to produce an original halftone film (halftone film) for a printed picture from an original printing film in accordance with "the present conversion method" defined by the conversion formula (1), a conventional system known well in the present field of art can be used. The production of such an original film can be achieved, for example, by designing the color separation and halftone scanning system of a commercial electronic color separation apparatus (color scanner or total scanner) or the like to perform "the present conversion method".

In a commercial scanner for example, a small spot light is irradiated to the original picture which is a continuous-tone picture. Reflected or transmitted light (pictorial information signals) is separated through a color filter, received at a phototube (photomultiplier), followed by photoelectric conversion, A/V conversion, density conversion by a logarithmic amplifier, and color modification and picture conversion by an analog-type computer or after A/D conversion, by a digital-type computer. Each current outputted finally from the computer is fed to an exposing light source. A raw stock is then exposed to a spot light to form machine plate adapted to make a printing plate. In such a well-known conventional system, it is only necessary to design the conversion unit of the computer in such a way that the tonal conversion method defined by the conversion formula (1) is performed.

By causing a photoelectrically-scanning spot light to advance successively in spots and synchronizing the exposure unit with the scanning, a machine plate for a halftone picture which has the dot area percentage (y) defined in the above conversion formula (1) and is to be printed can be formed.

Depending whether conversion is direct of indirect, tonal conversion methods for pictures may be classified basically into methods for immediately converting a continuous-tone picture having a linear density gradation characteristic curve into a halftone picture and methods for firstly performing the tonal conversion of a continuous-tone picture into another continuous-tone picture and then transforming the thus-converted continuous-tone picture into a halftone picture (since the tonal conversion has been performed, the term "transform" is used here to distinguish it from the conversion).

Each of the above-mentioned methods includes two approaches depending whether a density range is compressed or not, namely, one for converting the density range of a continuous-tone picture directly into a halftone density range without compressing the former density range and the other for converting the density range of a continuous-tone picture into a halftone density range by way of an intermediate picture having a density range corresponding to the halftone density range of a picture to be printed. In the actual practice of plate-making, it is only necessary to combine these fundamental methods of tonal conversion of a picture and to choose one suited to the environment of the work.

As a representative example, FIG. 1(a) shows one embodiment in which the base density range of a continuous-tone picture (original picture) having a linear density gradation characteristic curve is proportionally compressed to obtain an intermediate picture of a compressed density range. Another example of converting the original picture into a halftone picture by way of the intermediate picture of the compressed density range is shown in FIG. 1(b). Namely, the continuous-tone picture (original picture) having the linear density gradation characteristic curve is tonally converted and at the same time, its density range is compressed, thereby obtaining an intermediate picture whose tone has been converted and whose density range has been compressed. This picture is then converted proportionally to form a halftone picture.

In FIGS. 1(a) and 1(b), $D_o$: The density of an original picture whose gradation is continuous.

$DR_o$: The base density range of the original picture whose gradation is continuous. A value obtained by subtracting the density at the brightest area (H; the smallest dot at the high-light area) from the density at a control point (X) on the original, said density falling within the range $DR_o$, is the base density (x).

$D'_o$: The density of an intermediate picture having a density range obtained by compressing the density range of the original continuous-tone picture by the k value.

$DR'_o$: The density range of the intermediate picture having the compressed density range.

$D''_o$: The density of a continuous-tone picture obtained by converting the tone of the original continuous-tone picture in accordance with "the present conversion method" and also by compressing the density range of the original continuous-tone picture.

$D_p$: The dot area percentage of a halftone picture to be printed.

$DR_p$: The density range of the picture to be printed.

P: Halftone characteristic value based on a quality evaluation standard for a picture to be printed. P value is compared with y value to evaluate their matching.

H: The brightest area on the original (the smallest dot in the high-light area).

S: The darkest area on the original (the largest dot in the shadow area).

$M_1$: An area on the original, which has an intermediate density (intermediate density area).

$M_2$: A density area on the original, which determines the position of the 50% dot (area) on a halftone picture to be printed.

These symbols will have the same meaning in Examples which will be given subsequently herein.

ADVANTAGES OF THE INVENTION

The present invention exhibits the following superb effects.

(1) It is the most fundamental problem for the formation of a picture, which is to be printed, how to determine the relationship between the densities of an original picture (continuous-tone picture) and the values of their corresponding dot area percentages of a picture (halftone picture) to be printed. The determination has heretofore been conducted primarily by a non-rational method, namely, depending on the experiences and perception of a worker or based on information of a limited number of fixed given conditions. By "the conversion method", the conventional method can be replaced by a rational and simple method under any given conditions. In view of the fact that the quality of tonal condition (tonal conversion, modification or change), which is the most important requirement for converting a continuous-tone picture into a halftone picture, has a close and direct relation not only to the gradation of the picture but also to the tone of the picture. The photomechanical apparatus in which its important system for the conversion of a tone has been designed to perform "the present conversion method" can systematize theoretically, operatively and rationally the halftone scanning, color separation work or electronic color separation work, so that the work can be simplified. Its effect is hence extremely significant.

This contributes considerably not only to the photomechanical step but also to the rationalization, systematization and simplification of the overall process for the formation of printed pictures, including the photomechanical step.

(2) By having the tonal conversion system of the photomechanical apparatus perform "the present conversion method", the tonal conversion system of pictures which is a source for confusion in the use of present electronic color separation apparatus becomes no longer needed, so that the apparatus can be rationalized and simplified and the production cost can hence be cut down. The operation of such apparatus is also simplified and rendered straight forward, whereby the redoing of the work can be reduced to an extreme extent (original halftone films and proofs can be omitted), the consumption of expendable supplies can be reduced significantly, and the productivity of photomechanical apparatus can be improved substantially.

(3) Owing to the system which processes pictorial information signals and performs "the present conversion method", a standard can be set up rationally and easily for the quality evaluation of printed pictures independently of the quality and details of original pictures.

In other words, a rational technical medium can be provided commonly to an orderer of prints and a photomechanical engineer. It is hence ensured to achieve mutual understanding with extreme ease between the orderer and photomechanical engineer. It is hence possible to suitably meet needs of an orderer or to make proposals from the side of plate-making engineers.

(4) The present invention can eliminate conventional operational limitations caused by the poor photomechanical knowledge of design engineers of color scanners, such that the selectable range of halftone characteristic curves and color separation characteristic curves in the present scanners is limited and the number of selectable curves in the limited selectable range is very small (usually, only 3 curves).

Owing to the adoption of "the present conversion method", the work required for a worker to input his desired halftone characteristic curves has been rationalized and simplified, so that the time for the work can be shortened to 1/5-1/10 compared with commercial scanners. When a scanner equipped with a tonal picture conversion system capable of performing "the present conversion method" is used, the input work itself is of course rendered unnecessary.

(5) In the conversion of a continuous-tone picture for the formation of a halftone picture from the continuous-tone picture, the relationship between the conversion of the graduation of the picture add the conversion of the tone of the picture as well as the relationship between the conversion of the tone and color correction, color modification, color change and retouching can be clarified by the adoption of "the present conversion method". It hence becomes feasible to rationally meet each of such operations.

The color modification work required as everyday work in the present color separation work, namely, the correction of the so-called color fogging in color pictures can hence be omitted automatically, provided that the color separation work is conducted basically by using "the present conversion method", the tone0rendering-first-ism in the tonal conversion of the picture and the 4-point control method for the tonal conversion and by maintaining good gray balance over the entire gradation of the picture to be printed.

Owing to these features, the photomechanical apparatus of this invention has provided an extremely effective means for the rationalization of the process of photomechanical work.

(6) The use of "the present conversion method" has made it possible to rationally and easily set up a standard for the quality evaluation of a halftone picture (printed picture) independently of signals corresponding to the pictorial information of an original picture. Coupled with the possibility of provision of density gradation characteristic curves for the high-light area, shadow area and high-light to shadow area of the original picture, it is possible to substantially rationalize the system of the present advanced photomechanical apparatus.

(7) The adoption of "the present conversion method" for the processing of pictorial information signals has made it possible to effectively conduct the education and training of engineers, which are considered to be indispensable in view of the advancement of photomechanical apparatus. It is hence possible to avoid unnecessary labor in the daily work and to secure sufficient time for new and creative R & D activities.

EMBODIMENTS OF THE INVENTION

The photomechanical apparatus of this invention will hereinafter be described in detail on the basis of certain embodiments. It should however be borne in mind that the present invention is not limited to or by the following embodiments so long as the essential features thereof are not departed. (i) Application of a tonal conversion system, which can perform "the present conversion method", to conventional scanners:

Embodiments of the photomechanical apparatus according to this invention will next be described with reference to FIG. 2—FIG. 6. These embodiments will demonstrate that the application of a tonal conversion system pertaining to this invention to a present color scanner can simplify or significantly modify its construction to improve its function.

Figure 2:
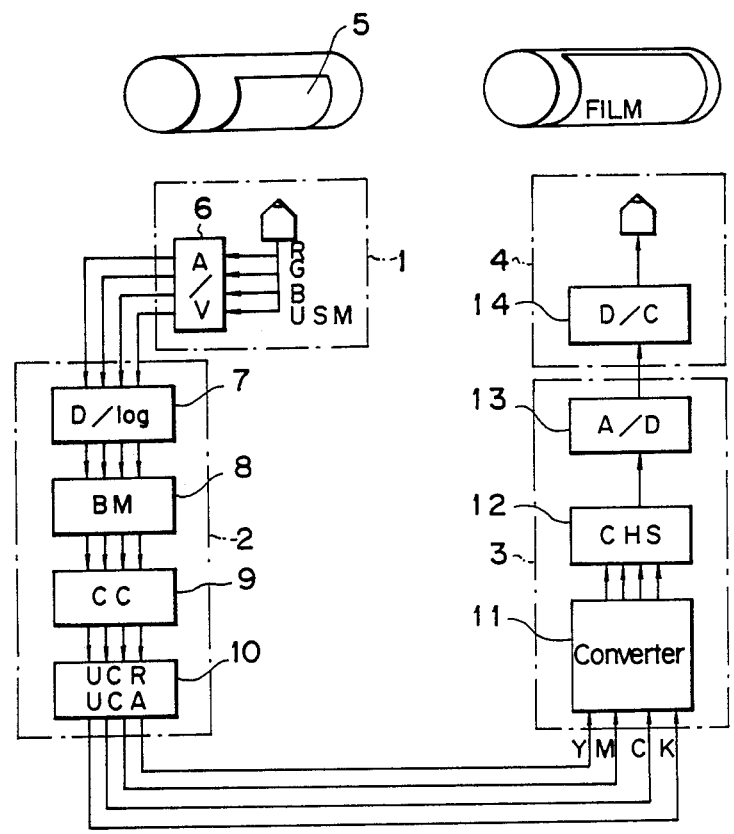
FIGS. 2-6 are block diagrams showing embodiments in each of which the tonal conversion system of this invention has incorporated in a color scanner.

In FIG. 2, a color scanner is constructed of four blocks, namely, a detection unit 1 for reading an original, a color separation unit 2 for converting output signals Y,M,C,K of the detection unit 1 into their corresponding color-separated signals, a tonal conversion unit 3 for obtaining an appropriate halftone gradation by using "the conversion method" described above, and an output unit 4 for performing the exposure of a film by a laser beam on the basis of signals outputted from the tonal conversion unit 3. The blocks of the detection unit 1, color separation unit 2 and output unit 4 have constructions similar to their corresponding units in conventional scanners.

The detection unit 1 detects light transmitted through or reflected by each area of an original 5 by means of a photomultiplier (not illustrated) or the like and outputs individual signals R,G,B,USM as current values. The signals are then converted into their corresponding voltage signals at an A/V converter 6.

The color separation unit 2 subjects the individual voltage signals R,G,B,USM, which have been fed from the detection unit 1, to a logarithmic operation at a logarithmic amplifier 7 so as to convert them into their corresponding densities. At a basic masking 8, the gray (K) component is separated from these densities, followed by separation of the individual components Y,M,C. Y-plate component, M-plate component and C-plate component are then controlled relative to the individual original color components R,G,B and Y,M,C at a color collection unit (CC) 9. Further, the gray component of the original is processed at an UCR (under color removal) or UCA (under color addition) of a UCR/UCA unit 10 so as to determine its proportions which are to be expressed by the three plates Y,M,C and the K plate respectively. After obtaining these components Y,M,C,K, the dot completion area percentages ye',me',ce',ke' of the respective components were conventionally determined at a gradation controller of a tonal conversion unit (IMC) and then subjected to an inverse logarithmic conversion at an inverse logarithmic conversion unit. In the present embodiment, a converter 11 is used in place of the gradation control unit and inverse logarithmic conversion unit. At the converter 11, the components Y,M,C,K are converted into the percentages ye',me',ce', ke'. The converter 11 is internally equipped with the algorithm of "the present conversion method", so that "the present conversion method" is applied to each of the components Y,M,C,K to determine the percentages ye',me',ce',ke'.

The converter 11 may take any one of various forms such as a general computer containing the algorithm of "the present conversion method" as software and equipped with an I/F (interface) of A/D and D/A, an electric circuit embodying the algorithm as a logic by a general computer, an electric circuit containing an ROM having computation results of the algorithm stored therein, a PAL, gate array or custon IC embodying the algorithm as an internal logic.

The dot completion area percentages obtained by the converter 11 are inputted to a color channel selector 12, whereby the color channel selector 12 outputs the percentages ye',me',ce',ke' successively and selectively. These outputs are subjected to an A/D conversion at an A/D converter 13 and are then outputted to the output unit 4. At the output unit 4, a laser beam is controlled by a dot controller 14 on the basis of the outputs from the tonal conversion unit 3.

Figure 3:
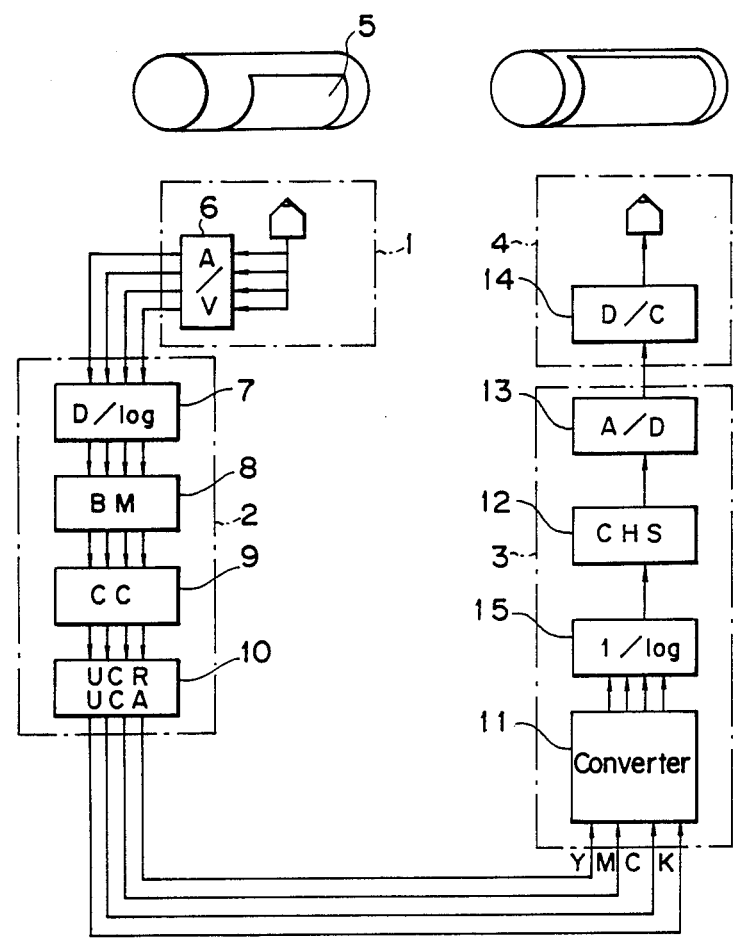

FIG. 3 shows a second embodiment, in which a conventional inverse logarithmic converter 15 is used as is. The percentages ye',me',ce',ke' are therefore outputted in a logarithmic form from the converter 11. It is hence possible to apply "the present conversion method" by replacing only one of the elements of a conventional color scanner. The conventional system can therefore be modified into a system according to this invention by making a smaller change compared with the change required to construct the system of the first embodiment.

Figure 4:
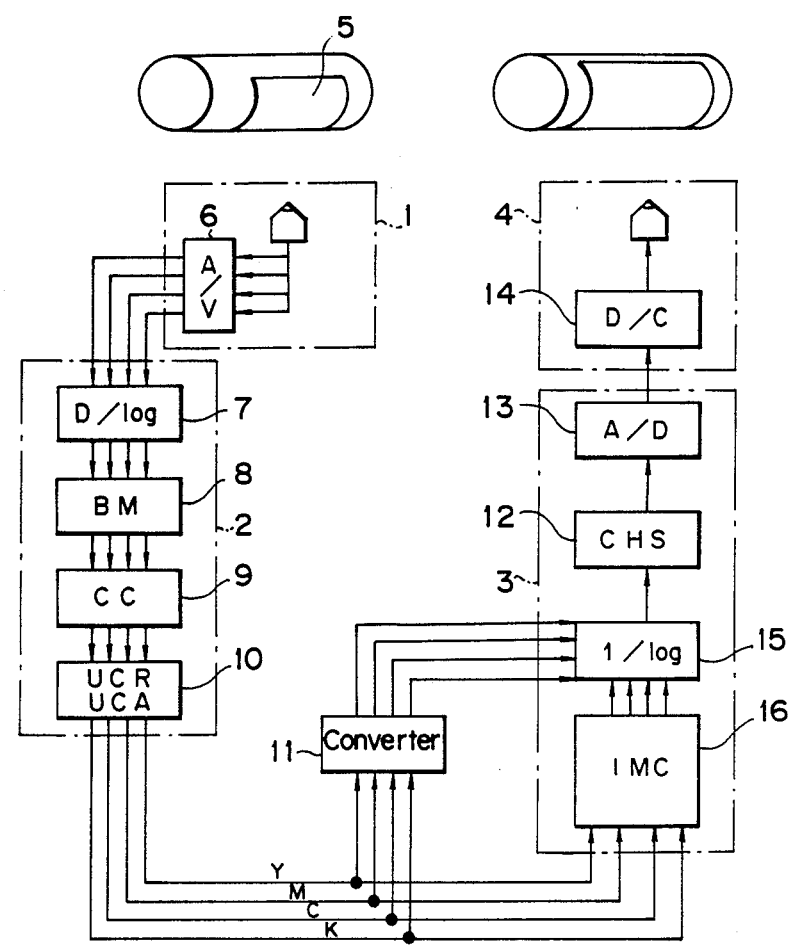

FIG. 4 illustrates a third embodiment. A conventional gradation controller (IMC) 16 is left as is. The inverse logarithmic converter 15 and gradation controller 16 are normally disconnected from each other. The same converter as that employed in the second embodiment, namely, the converter 11 capable of outputting the percentages ye',me',ce',ke' in a logarithmic form is used. The converter 11 receives the signals Y,M,C,K from the upstream side of the gradation controller 16 and outputs converted values to the inverse logarithmic converter 15.

Figure 5:
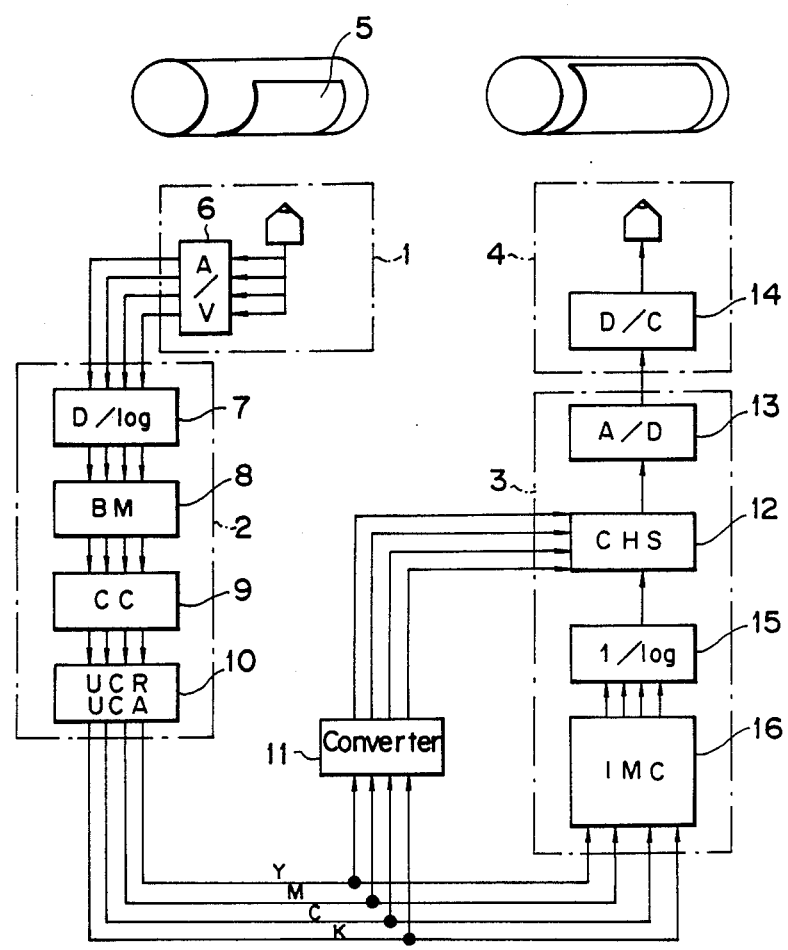

FIG. 5 depicts a fourth embodiment. the inverse logarithmic converter 15 is normally disconnected from a color channel selector 12. The converter 11 receives the signals Y,M,C,K from the upstream side of the gradation controller 16, so that the percentages ye', me',ce',ke' can be obtained directly at the color channel selector 12, in a form processed to the same optimal level as that achieved by the converter 11 of the first embodiment, without being affected by the conventional system. Like the third embodiment, the system of this invention has been successfully embodied by making the slight modification to the conventional system.

Figure 6:
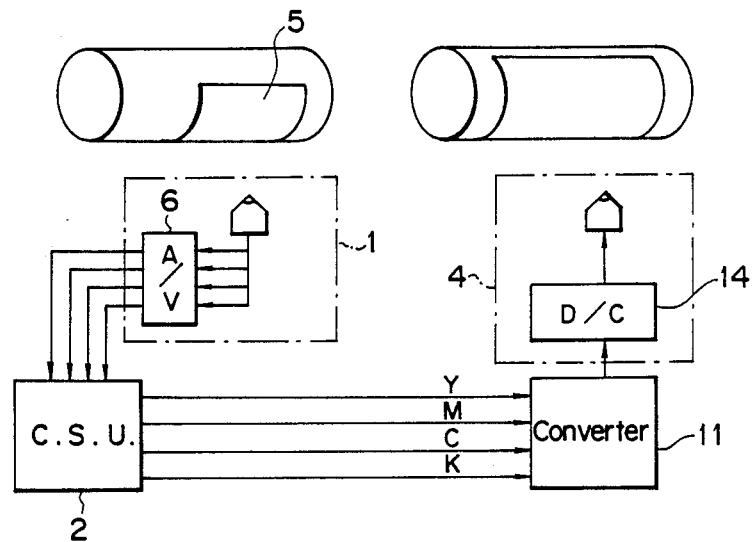

FIG. 6 shows a fifth embodiment. A conventional tonal conversion unit has been constructed in its entirety as a new converter 11. At the converter 11, "the present conversion method" can be practised.

If the tonal conversion unit is modified in its entirety as described above, it is possible to practise "the present conversion method" in combination with other processings. Owing to this optimization of the system, both speed-up and size reduction can be materialized so that the cost performance per system ca be increased.

In the above embodiments, the color separation unit have the same construction as that employed in conventional systems. Owing to the use of "the present conversion method", the color separation unit may be used without the color collection (CC) unit 9 and USR/UCA unit 10 if they are not required.

Advantageous effects derived from the prior art for example, dull masking and sharpness effects not associated directly with the present invention are not referred to in the description of the above embodiment.

Upon application of "the present conversion method", on the basis of the reflection density of an yellow ink printed solid in a proof, one halftone characteristic curve is chosen from plural halftone characteristic curves obtained in advance by using "the present conversion method". The thus-chosen curve is used as a halftone characteristic curve for a base plate (C plate in most cases) for printed color pictures. Based on the halftone characteristic curve of the base plate, halftone characteristic curves (work standard characteristic curves) of the plates of the other colors are obtained in the same manner. This work should be conducted in such a way that the tonal conversion of the picture of each color plate can be effected while fulfilling the principles of the tone-renderin-first-ism in the conversion of a picture (including the 4-point control method replacing the 3-point control method in the tonal conversion and control of the picture) and the maintenance of good gray balance over the entire range of gradation of the picture. Further, the individual parameters of "the present conversion method", namely, the surface reflectivity $\alpha$ of the paper of an original, the surface reflectivities $\beta$ of inks, the dot area percentage $y_h$ of the high-light area, the dot area percentage $y_s$ of the shadow area and k (the density range of a picture to be printed/the density range of the pictures of the original) are suitably set at the converter by a method known per se in the art.

According to a color scanner in which the present invention has been incorporated, the experiences and perception of a worker, which have heretofore been indispensable, are not required and the limitation to the selectable range of halftone characteristic curves can be eliminated. (ii) Usefulness of "the present conversion method" applied to the tonal conversion system of the photomechanical apparatus of this invention:

As an auxiliary explanation for facilitating the understanding of this invention, "the present conversion method" which is a principal element for making the tonal conversion system of this invention operative will hereinafter be described in detail based primarily on certain work examples. (I) Experimental operation of "the present conversion method":

The following two experiments were conducted as basic experiments for having the tonal conversion system of an advanced photomechanical apparatus practise "the present conversion method".

(a) First of all, a conventional simple calculator, namely, "Sharp Pythagorean EL509" (trade name; manufactured by Sharp Corporation) was provided. The simple calculator was operated while introducing predetermined figures in "the present conversion method", whereby tonal conversion tables of pictures were obtained as shown subsequently in Tables 1(a), 1(b) and 1(c), Table 2 and Table 3

As a result, the time periods required for the preparation of the tables were 3 hours, 2 hours and 2 hours respectively, including the time spent for checking the calculation results.

Once one settles down to the work, the above work time periods can be shortened by about 50%.

(b) The following experiment was also conducted.

A prescribed soft, which had been obtained separately, was inputted as function data in a simple personal computer ("PC-9801-M2", trade name; manufactured by NEC Corporation). Densities of an original picture (continuous-tone picture) were converted to dot are percentages of their corresponding dots of a half-tone picture.

Of course, the same figures as those calculated by the above simple calculator were obtained.

The above soft, which was suitable for use in the tonal conversion of a picture in order to input the data of the picture in the personal computer in the above experiment, was also prepared by using N88-BACIC provided as an accessory with the personal computer without using any special soft. It took only 1 hour for the completion of the soft.

In an experimental operation of the tonal conversion by the soft prepared as described above, it was confirmed that the intended tonal conversion and correction of the picture can be performed even when densities of the high-light area (H) and shadow area (S) of the original picture as measured by a densitometer are inputted as they are.

In addition, intended dot area percentages can also be obtained by setting desired density intervals (by way of example, the range of 0.00–1.00 was divided in 0.5 increments while the range of 1.00–3.00 was divided in 0.10 increments) on an original picture and then inputting the data in the same personal computer.

By inputting the densities at plural position from the high-right area to the shadow area on an original picture, their corresponding desired dot area pecentages can also be obtained.

The figures of the dot area percentages computed by the above-described soft may be outputted either singly or at once whether the picture is positive or negative.

The usefulness of Tables 1(1), 1(2) and 1(3), Table 2 and Table 3, which will be given subsequently, will next be described. [Tables 1(1), 1(2) and 1(3)]

Table 1 shows how the dot area percentage at each control point has to be chosen in order to obtain an ideal halftone characteristic curve when a printed monochrome picture is produced from an original picture and the density of a printing ink (the density range of the printed picture) and the range of dots used (the range of dots used was selected following the usual method of monochrome halftone scanning in the present field of art) are changed.

It is appreciated from this table how the ideal halftone characteristic curve changes or should be changed in accordance with the range of dot area percentages to be used even if the density of a printing ink remains unchanged.

It is the basic requirement for each color separation work for the fabrication of multi-color printing plates that a monochrome picture to be printed, which is a halftone picture corresponding at 1:1 to a continuous-tone picture as an original, be formed from the original and skill must be learnt to permit the free conversion of the tone of the monochrome picture to be printed.

[Table 2]

Table 2 contains a listing of dot area percentages at individual control points, which are required for producing printed pictures of similar tone and quality (except for the overall contrast of each picture), as judged in accordance with the visual sensation of a man, by using dot area percentages in the range of from 0% to 100% when the density of a printing ink changed upon production of a printed monochrome picture from an original picture in the same manner as in Table 1.

In other words, Table 2 shows dot area percentages of respective control points on an ideal halftone characteristic curve corresponding to the maximum density of a printing ink to be used, when given conditions are ideal.

[Table 3]

Although the basic conditions are the same as those employed in Table 2, Table 3 illustrates the area percentages of dots which are supposed to be placed at respective control points on an ideal halftone characteristic curve when the dot area range (5% -95%) employed routinely in the present field of art is used.

Incidentally, it will be understood without need for any further explanation that Table 3 is the basis of "the present conversion technique".

Since the tonal conversion of a picture, which is the first step of the photomechanical process, especially, the color separation work and serves as a basis for the formation of a printed picture, has been dependent primarily on the experiences and perception of a man or on information of a limited number of fixed given conditions to date (the importance of the tonal conversion has been expressed by the word "tone-rendering-first-ism" in this invention), no attempt has heretofore been made to theoretically analyze the color separation work and the like on the basis of a picture to be printed.

However, "the conversion technique" of this invention can change it into a rational method. Owing to the relationship between the base density of the original picture and the corresponding dot area percentages as determined in accordance with "the present conversion method", the above-described data of Table 1–Table 3 can be used as basic information useful in effecting a scientific study on various matters most fundamental for the color separation work.

It is hence possible to extract elements regarding what nature and principle exist between an original picture and its color separation work and what matters have to be watched and considered in order to achieve rational matching between such nature and principle and the practice.

Incidentally, $\alpha$ and $\beta$ were set at 100% and 0% respectively upon preparation of each table.

(II) Conformity between values computed in accordance with "the present conversion method" and actual value The effectiveness of "the present conversion method" was next evaluated by comparing values [the relationship between base densities (x) and their corresponding dot area percentages (y)] computed by "the present conversion method" with actual values of companies which are performing color separation by means of a color scanner.

(b 1) Description of Table 4

Table 4 shows the results of a comparison between values computed in accordance with "the present conversion method" and the dot area percentages of work standard of A Company which are performing color separation by using a color scanner, Model CP-341ER, manufactured by DR-LNG RUDOLF HELL GmbH, West Germany, the standard gray scale (S.G.S.) of Eastman Kodak Company as a standard, and color films made by Eastman Kodak Company (E Company) and color films made by Fuji Photo Film Co., Ltd. (F Company) as originals.

(2) Description of Table 5

Table 5 depicts the results of a comparison between values computed in accordance with "the present conversion method" and the dot area percentages of work standard of D Company which are performing color separation by using a color scanner, Model SG-808, manufactured by Dainippon Screen Mfg. Co., Ltd., the standard gray scale (S.G.S.) of Fuji Photo Film Co., Ltd. as a standard, and color films made by Eastman Kodak Company (E Company) and color films made by Fuji Photo Film Co., Ltd. (F Company) as originals.

From the results of Tables 4 and 5, the standard dot area percentage tables and the results of the computation by "the present conversion technique" can be judged to have good conformity practically, in view of the fact that the standard dot area percentages of both A Company and D Company were set up in accordance with their workers' experiences and perception or information of a limited number of fixed given conditions and these workers do no regard their standard dot area percent tables as the best ones and desire further improvements.

Since "the conversion method" of this invention has a high degree of freedom in operability, it can easily set up a standard dot area percentage table as the best and most suitable table.

When "the present conversion method" is relied upon, the gradation of halftone of a printed picture can be controlled rationally by choosing the $DR_p$ value (the density range of the printed picture) and $\epsilon$ value appropriately on the basis of the reflection density of a printing ink (said reflection density affects $DR_p$ and $\epsilon$).

The computed values of Tables 4–5 can be easily determined by setting desired $y_h$, $y_s$, $\epsilon$ value and $\alpha/\beta$ value in a single continuous computing operation when a person having average knowledge uses a simple calculator ("Sharp Pythagorean ET-509A", trade name, manufactured by Sharp Corporation). (III) Application of "the present conversion method" to the modification (or change) of gradation:

It will next be demonstrated that "the present conversion method" is effective not only for the tonal conversion of a picture (namely, the tonal conversion from a continuous tone to a halftone having high fidelity) but also for modifying an original picture in such a way that after effecting the tonal conversion of the picture, a picture to be printed as observed through the eyes of a man is itself modified (or changed), in other words, for the modification (or change) of the gradation The modification (or change) of the gradation of a picture to be printed is required, for example, when it is desired to move the position ($M_2$) of 50% dot area percentage in accordance with the degree of reduction or enlargement or especially, to express or show the gradation of the high-light area or shadow area better (stronger).

When the dot area percentages of the smallest dot of the high-light area (H) and the largest dot of the shadow area (S) of a picture to be printed are fixed, for example, at specific values of 5% and 95% respectively, an issue arises how the setting point ($M_2$) of 50% dot area percentage, which is an extremely important control point on a picture to be printed, should be shifted in accordance with variations of the reflection density of a printing ink (a yellow ink is used as a standard) or variations of the degree of reduction or enlargement from an original picture to the printed picture in order to perform the modification or change of the gradation of the picture.

Basic data useful for the solution of a problem of the above sort are shown by way of example in Table 6.

By providing plural data as basic data in accordance with the needs of actual work, the position ($M_2$) of 50% dot area percentage can be moved rationally so that the gradation of a picture can be converted and the tonal modification (change) of a picture can be performed.

The density range of each printed picture in Table 6, which corresponds to $DR_p$ in FIG. 1, is determined depending on the density of an area printed solid with a yellow ink in a set of inks employed (and the value $\beta$ can also be determined on the basis of the density range). The figure given in parentheses under each density range is the value of $\epsilon$ $[=\alpha/(\alpha-\beta)]$. In each space (frame) of each table, the figure shown in parettheses in the upper row is the base density (x) at that control point. The figure in the lower row in each space (frame) indicates the value of a dot area percentage (y) corresponding to the base density.

Regarding the range of dots employed, dot areas 5%–95% were used in accordance with the routine practice in the present field of art. Computed values shown in Table 6 are extremely important for the control of the position of 50% dot area percentage and also for the control of the dot area percentage at the point $M_2$.

For example, it was attempted to produce a printed picture at a reduction/enlargement rate of 100% from an original color picture making use of a film made by E Company. A printed picture of desired quality was obtained when the density rage of the printed picture and $\epsilon$ value were set at 0.95 and 1.12638 respectively. A halftone characteristic curve is then drawn on the basis of the computed values in Table 6 (namely, the characteristic curve is prepared by plotting the base density range (x) of the original picture along the axis of abscissas and the dot area percentage (y) along the axis of ordinates). Next, the reduction/enlargement rate is changed with respect to the base plate. The position of 50% dot area percentage is shifted toward the S side for reduction but is moved toward the H side for enlargement. A halftone picture is then formed on a film. Test pictures obtained in the above-described manner are compared with the printed halftone picture corresponding to the base plate. The test picture having the same quality as the latter halftone picture is chosen. Let's now assume by way of example that the density range of the printed picture and $\epsilon$ value were 0.85 and 1.16449 respectively when the original picture was reduced to one half, 1.10 and 1.08629 respectively when the original picture was enlarged to 200%, and 1.25 and 1.05958 respectively when the original picture was enlarged to 400%. Halftone characteristic curves for the above reduction/enlargement rates are then drawn. Based on the crossing points between the respective curves and a straight line indicating 50% dot area percentage, it is possible to find out the density of a control point of the original picture where 50% dot area percentage is supposed to be given (in practice, the control point is determined on a work standard gray scale representing the original picture). It is for the convenience of inspection of a halftone picture after the color separation work that the density where 50% dot area percentage is given has been chosen as the density of control points. It is hence not necessary to limit the density to 50% dot area percentage. As an alternative, it is then possible to choose control points at positions corresponding respectively to 2/8 and 4/8 of the density range of the original picture, to determine from the halftone characteristic curve at which percentages the dot area percentages to be given to the positions are set, and then to perform color separation work under the conditions thus set. As has been described above, it is possible to perform rationally the modification (or change) of the tone of a picture concurrently with the tonal conversion of the picture by using Table 6.

The modification (or change) of the picture is needed depending not only on the reduction/enlargement rate of a picture to be printed but also on the desire or preference of the orderer for prints, the kind of a target picture photographed in the color original, the purpose of use of the printed pictures, the whiteness of printing paper, the densities of printing inks, etc. Such modification (or change) can always be achieved rationally in accordance with Table 6. Table 6 also permits the standardization of various color separation work.

It is also feasible to perform the tonal modification (change) of a picture at its high-light and shadow areas in the same manner. By effecting the above-described tonal conversion, namely, by conducting the tonal conversion and/or tonal modification (or change) of the picture, any color fog in the high-light area of a color original can be automatically removed without need for any special measure. Experiments:

Employed as a color separation characteristic curve (halftone characteristic curve) for a cyan plate (C) was pictorial information determined in accordance with the conversion formula (1) under the following conditions. An original was a positive color film having a still-life picture whose H and S areas were measured to have densities of 0.2 and 2.8 as well as a portrait whose H and S areas were determined to have densities of 0.2 and 2.0. The density of an area printed solid by a yellow plate was 0.9, from which the value $\beta$ was computed. The reflectivity ($\alpha$) of paper was 100%. At the high-light area (H) and shadow area (S) of a picture printed by the cyan plate which was the standard plate for the color separation, 3% dots and 95% dots were placed respectively. In addition, based on the color separation characteristic curve for the cyan plate (C), a characteristic curve capable of providing 2% dots at the high-light area (H), 90% dots at the shadow area (S), dots of a dot area percentage smaller by 8–10 percent in an intermediate tone than the cyan plate was determined in accordance with the conversion formula (1) by using a personal computer. This characteristic curve was employed as a color separation characteristics curve for the yellow plate (Y) and magenta plate (M).

For a black plate (BL), the conventional color separation characteristic curve was used as was. Color modification and correction were performed in the conventional manner.

Under the above-given conditions, color separation was conducted by using the scanner, Model CP-341ER, manufactured by DR-LNG RUDOLF HELL GmbH and color proof was performed with Cromalin (trade mark; product of E. I. du Pont de Nemours & Co., Inc.). It was possible to obtain extremely-satisfactory result as expected in advance.

Namely, the overall tone of the printed picture was by no means inferior to the quality of a picture printed in colors on a paper sheet and the gradation of the picture and the sharpness of its color were both satisfactory.

It was the effects of the present invention, which were not expected at the beginning, that an object having soft appearance like a blanket and an object having hard appearance like a metal product were both expressed (reproduced) well although their reproduction in a printed picture had been said to be difficult.

As has been mentioned above, the tonal conversion and modification (or change) of a picture, which has heretofore been performed on the basis of the experiences and perception of a man or information of a limited number of fixed given conditions in color separation work, can be rationalized scientifically under an given conditions.

TABLE 1

Relationship between Density Range of Picture Printed in Continuous Tone and Theoretical Halftone Dot Percentage
Conversion formula: $y = k(1 - 10^{-kx})$   x: Picture density   y: Dot area percentage
$k = 1, \alpha = 100\%, \beta = 0\%$

| Density range of printed picture | Maximum dot area percentage | k value | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
|---|---|---|---|---|---|---|---|---|---|
| 1.60 | Control point | Density | 0.000 | 0.200 | 0.400 | 0.600 | 0.800 | 1.200 | 1.600 |
|  | Dot (%) | Theoretical point | 0.000 | 36.904 | 60.189 | 74.881 | 84.151 | 93.690 | 97.488 |
|  | 100% | 1.02577 | 0.00 | 37.86 | 61.74 | 76.81 | 86.32 | 96.10 | 100.00 |
|  | 98% | 1.00525 | 0.00 | 37.10 | 60.50 | 74.58 | 84.59 | 94.18 | 98.00 |
|  | 95% | 0.97448 | 0.00 | 35.96 | 58.65 | 72.97 | 82.00 | 91.30 | 95.00 |
| 1.55 | Control point | Density | 0.000 | 0.194 | 0.388 | 0.581 | 0.775 | 1.163 | 1.550 |
|  | Dot (%) | Theoretical point | 0.000 | 36.027 | 59.074 | 73.758 | 83.212 | 93.125 | 97.182 |
|  | 100% | 1.02900 | 0.00 | 37.07 | 60.78 | 75.90 | 85.63 | 95.83 | 100.00 |
|  | 98% | 1.00842 | 0.00 | 36.33 | 59.57 | 74.38 | 83.91 | 93.91 | 98.00 |
|  | 95% | 0.97755 | 0.00 | 35.22 | 57.75 | 72.10 | 81.34 | 91.04 | 95.00 |
| 1.50 | Control point | Density | 0.000 | 0.188 | 0.375 | 0.563 | 0.750 | 1.125 | 1.500 |
|  | Dot (%) | Theoretical point | 0.000 | 35.137 | 57.830 | 72.647 | 82.217 | 92.501 | 96.838 |
|  | 100% | 1.03265 | 0.00 | 36.28 | 59.28 | 72.02 | 84.90 | 95.52 | 100.00 |
|  | 98% | 1.01200 | 0.00 | 35.56 | 58.52 | 73.52 | 83.20 | 93.61 | 98.00 |
|  | 95% | 0.98102 | 0.00 | 34.47 | 56.73 | 71.27 | 80.66 | 90.75 | 95.00 |
| 1.45 | Control point | Density | 0.000 | 0.181 | 0.363 | 0.544 | 0.725 | 1.088 | 1.450 |
|  | Dot (%) | Theoretical point | 0.000 | 34.083 | 56.649 | 71.424 | 81.164 | 91.834 | 96.452 |
|  | 100% | 1.03675 | 0.00 | 35.34 | 58.73 | 74.05 | 84.15 | 95.21 | 100.00 |
|  | 98% | 1.01605 | 0.00 | 34.63 | 57.56 | 72.57 | 82.47 | 93.31 | 98.00 |
|  | 95% | 0.98495 | 0.00 | 33.57 | 55.80 | 70.35 | 79.94 | 90.45 | 95.00 |
| 1.40 | Control point | Density | 0.000 | 0.175 | 0.350 | 0.525 | 0.700 | 1.050 | 1.400 |
|  | Dot (%) | Theoretical point | 0.000 | 33.166 | 55.332 | 70.146 | 80.047 | 91.089 | 96.019 |
|  | 100% | 1.04146 | 0.00 | 34.54 | 57.63 | 73.05 | 83.37 | 94.86 | 100.00 |
|  | 98% | 1.02063 | 0.00 | 33.85 | 56.47 | 71.59 | 81.70 | 92.97 | 98.00 |
|  | 95% | 0.98939 | 0.00 | 32.81 | 54.74 | 69.40 | 79.20 | 90.12 | 95.00 |
| 1.35 | Control point | Density | 0.000 | 0.169 | 0.338 | 0.506 | 0.675 | 1.013 | 1.350 |
|  | Dot (%) | Theoretical point | 0.000 | 32.236 | 54.080 | 68.811 | 78.865 | 90.295 | 95.533 |
|  | 100% | 1.04676 | 0.00 | 33.74 | 56.61 | 72.03 | 82.55 | 94.52 | 100.00 |
|  | 98% | 1.02582 | 0.00 | 33.07 | 55.48 | 70.59 | 80.90 | 92.63 | 98.00 |
|  | 95% | 0.99442 | 0.00 | 32.06 | 53.78 | 68.43 | 78.42 | 89.79 | 95.00 |
| 1.30 | Control point | Density | 0.000 | 0.163 | 0.325 | 0.488 | 0.650 | 0.975 | 1.300 |
|  | Dot (%) | Theoretical point | 0.000 | 31.293 | 52.685 | 67.491 | 77.612 | 89.407 | 94.988 |
|  | 100% | 1.05276 | 0.00 | 32.94 | 55.46 | 71.05 | 81.71 | 94.12 | 100.00 |
|  | 98% | 1.03171 | 0.00 | 32.28 | 54.36 | 69.63 | 80.07 | 92.24 | 98.00 |
|  | 95% | 1.00013 | 0.00 | 31.30 | 52.69 | 67.50 | 77.62 | 89.42 | 95.00 |
| 1.25 | Control point | Density | 0.000 | 0.156 | 0.313 | 0.469 | 0.625 | 0.938 | 1.250 |
|  | Dot (%) | Theoretical point | 0.000 | 30.177 | 51.359 | 66.037 | 76.286 | 88.465 | 94.377 |
|  | 100% | 1.05958 | 0.00 | 31.97 | 54.42 | 69.97 | 80.83 | 93.74 | 100.00 |
|  | 98% | 1.03839 | 0.00 | 31.34 | 53.33 | 68.57 | 79.21 | 91.86 | 98.00 |
|  | 95% | 1.00660 | 0.00 | 30.38 | 51.70 | 66.47 | 76.79 | 89.05 | 95.00 |
| 1.20 | Control point | Density | 0.000 | 0.150 | 0.300 | 0.450 | 0.600 | 0.900 | 1.200 |
|  | Dot (%) | Theoretical point | 0.000 | 29.205 | 49.881 | 64.519 | 74.881 | 87.411 | 93.690 |
|  | 100% | 1.06734 | 0.00 | 31.17 | 53.24 | 68.86 | 79.92 | 93.30 | 100.00 |
|  | 98% | 1.04600 | 0.00 | 30.55 | 52.18 | 67.49 | 78.33 | 91.43 | 98.00 |
|  | 95% | 1.01398 | 0.00 | 29.61 | 50.58 | 65.42 | 75.93 | 88.63 | 95.00 |
| 1.15 | Control point | Density | 0.000 | 0.144 | 0.288 | 0.431 | 0.575 | 0.863 | 1.150 |
|  | Dot (%) | Theoretical point | 0.000 | 28.221 | 48.477 | 62.932 | 73.393 | 86.291 | 92.921 |
|  | 100% | 1.07619 | 0.00 | 30.37 | 52.17 | 67.73 | 78.98 | 92.87 | 100.00 |
|  | 98% | 1.05478 | 0.00 | 29.77 | 51.13 | 66.38 | 77.41 | 91.02 | 98.00 |
|  | 95% | 1.02237 | 0.00 | 28.85 | 49.56 | 64.34 | 75.03 | 88.22 | 95.00 |
| 1.10 | Control point | Density | 0.000 | 0.138 | 0.275 | 0.413 | 0.550 | 0.825 | 1.100 |
|  | Dot (%) | Theoretical point | 0.000 | 27.222 | 46.912 | 61.363 | 71.816 | 85.037 | 92.057 |
|  | 100% | 1.08629 | 0.00 | 29.57 | 50.96 | 66.66 | 78.01 | 92.37 | 100.00 |
|  | 98% | 1.06456 | 0.00 | 28.98 | 49.94 | 65.32 | 76.45 | 90.53 | 98.00 |
|  | 95% | 1.03197 | 0.00 | 28.09 | 48.41 | 63.32 | 74.11 | 87.76 | 95.00 |
| 1.05 | Control point | Density | 0.000 | 0.131 | 0.263 | 0.394 | 0.525 | 0.788 | 1.050 |
|  | Dot (%) | Theoretical point | 0.000 | 26.039 | 45.424 | 59.635 | 70.146 | 83.707 | 91.082 |
|  | 100% | 1.09785 | 0.00 | 28.59 | 49.87 | 65.47 | 77.01 | 91.90 | 100.00 |
|  | 98% | 1.07589 | 0.00 | 28.02 | 48.87 | 64.16 | 75.47 | 90.06 | 98.00 |
|  | 95% | 1.04296 | 0.00 | 27.16 | 47.38 | 62.20 | 73.16 | 87.30 | 95.00 |
| 1.00 | Control point | Density | 0.000 | 0.125 | 0.250 | 0.375 | 0.500 | 0.750 | 1.000 |
|  | Dot (%) | Theoretical point | 0.000 | 25.011 | 43.766 | 57.830 | 68.377 | 82.217 | 90.000 |
|  | 100% | 1.11111 | 0.00 | 27.79 | 48.62 | 64.26 | 75.97 | 91.35 | 100.00 |
|  | 98% | 1.08889 | 0.00 | 27.23 | 47.66 | 62.97 | 74.46 | 89.53 | 98.00 |
|  | 95% | 1.05556 | 0.00 | 26.40 | 46.20 | 61.04 | 72.18 | 86.78 | 95.00 |

TABLE 1-continued

Relationship between Density Range of Picture Printed in Continuous Tone and Theoretical Halftone Dot Percentage Conversion formula: $y = k(1 - 10^{-kx})$  x: Picture density  y: Dot area percentage
$k = 1, \alpha = 100\%, \beta = 0\%$

| Density range of printed picture | Maximum dot area percentage | k value | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
|---|---|---|---|---|---|---|---|---|---|
| 0.95 | Control point | Density | 0.000 | 0.119 | 0.238 | 0.356 | 0.475 | 0.713 | 0.950 |
|  | Dot (%) | Theoretical point | 0.000 | 23.967 | 42.190 | 55.945 | 66.503 | 80.636 | 88.780 |
|  | 100% | 1.12638 | 0.00 | 27.00 | 47.52 | 63.02 | 74.91 | 90.83 | 100.00 |
|  | 98% | 1.10385 | 0.00 | 26.46 | 46.57 | 61.75 | 73.41 | 89.01 | 98.00 |
|  | 95% | 1.07006 | 0.00 | 25.65 | 45.15 | 59.86 | 71.16 | 86.29 | 95.00 |
| 0.90 | Control point | Density | 0.000 | 0.113 | 0.213 | 0.338 | 0.425 | 0.675 | 0.900 |
|  | Dot (%) | Theoretical point | 0.000 | 22.910 | 38.765 | 54.080 | 62.416 | 78.865 | 87.411 |
|  | 100% | 1.14402 | 0.00 | 26.21 | 44.35 | 61.87 | 71.41 | 90.22 | 100.00 |
|  | 98% | 1.12114 | 0.00 | 25.69 | 43.46 | 60.63 | 70.00 | 88.42 | 98.00 |
|  | 95% | 1.08682 | 0.00 | 24.90 | 42.13 | 58.78 | 67.83 | 85.71 | 95.00 |

TABLE 2

Relationship between Density Range of Printed Picture and Theoretical Dot Area Percentage
(Total Control points of original picture: $\frac{1}{8}$ of original picture density range and dot size range)
Dot area range used: 0%–100%

(Unit: percent)

| Density range of printed picture | Control point of original |  |  |  |  |  |  |
|---|---|---|---|---|---|---|---|
|  | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
| 1.60 | 0.00 | 37.86 | 61.74 | 76.81 | 86.32 | 96.10 | 100.00 |
| 1.55 | 0.00 | 37.07 | 60.78 | 75.90 | 85.63 | 95.83 | 100.00 |
| 1.50 | 0.00 | 36.28 | 59.72 | 75.02 | 84.90 | 95.52 | 100.00 |
| 1.45 | 0.00 | 35.34 | 58.73 | 74.05 | 84.15 | 95.21 | 100.00 |
| 1.40 | 0.00 | 34.54 | 57.63 | 73.05 | 83.37 | 94.86 | 100.00 |
| 1.35 | 0.00 | 33.74 | 56.61 | 72.03 | 82.55 | 94.52 | 100.00 |
| 1.30 | 0.00 | 32.94 | 55.46 | 71.05 | 81.71 | 94.12 | 100.00 |
| 1.25 | 0.00 | 31.97 | 54.42 | 69.97 | 80.83 | 93.74 | 100.00 |
| 1.20 | 0.00 | 31.17 | 53.24 | 68.86 | 79.92 | 93.30 | 100.00 |
| 1.15 | 0.00 | 30.37 | 52.17 | 67.73 | 78.98 | 92.87 | 100.00 |
| 1.10 | 0.00 | 29.57 | 50.96 | 66.66 | 78.01 | 92.37 | 100.00 |
| 1.05 | 0.00 | 28.59 | 49.87 | 65.47 | 77.01 | 91.90 | 100.00 |
| 1.00 | 0.00 | 27.79 | 48.62 | 64.26 | 75.97 | 91.35 | 100.00 |
| 0.95 | 0.00 | 27.00 | 47.52 | 63.02 | 74.91 | 90.83 | 100.00 |
| 0.90 | 0.00 | 26.21 | 44.35 | 61.87 | 71.41 | 90.22 | 100.00 |

TABLE 3

Relationship between Density Range of Printed Picture and Dot Area Percentage
Dot area size range used: 5%–95%

(Unit: percent)

| Density range of printed picture | Control point of original |  |  |  |  |  |  |
|---|---|---|---|---|---|---|---|
|  | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
| 1.60 | 5.00 | 39.07 | 60.56 | 74.13 | 82.68 | 91.49 | 95.00 |
| 1.55 | 5.00 | 38.37 | 59.71 | 73.31 | 82.06 | 91.25 | 95.00 |
| 1.50 | 5.00 | 37.66 | 58.74 | 72.52 | 81.41 | 90.97 | 95.00 |
| 1.45 | 5.00 | 36.80 | 57.86 | 71.65 | 80.73 | 90.69 | 95.00 |
| 1.40 | 5.00 | 36.08 | 56.86 | 70.75 | 80.03 | 90.38 | 95.00 |
| 1.35 | 5.00 | 35.37 | 55.95 | 69.78 | 79.29 | 90.06 | 95.00 |
| 1.30 | 5.00 | 34.65 | 54.92 | 68.95 | 78.53 | 89.71 | 95.00 |
| 1.25 | 5.00 | 33.78 | 53.98 | 67.97 | 77.75 | 89.36 | 95.00 |
| 1.20 | 5.00 | 33.05 | 52.92 | 66.98 | 76.93 | 88.97 | 95.00 |
| 1.15 | 5.00 | 32.33 | 51.95 | 65.95 | 76.08 | 88.57 | 95.00 |
| 1.10 | 5.00 | 31.61 | 50.86 | 64.99 | 75.21 | 88.14 | 95.00 |
| 1.05 | 5.00 | 30.73 | 49.89 | 63.93 | 74.31 | 87.71 | 95.00 |
| 1.00 | 5.00 | 30.01 | 48.77 | 62.83 | 73.38 | 87.21 | 95.00 |
| 0.95 | 5.00 | 29.30 | 47.77 | 61.71 | 72.41 | 86.75 | 95.00 |
| 0.90 | 5.00 | 28.59 | 44.91 | 60.69 | 69.26 | 86.20 | 95.00 |

TABLE 4

Comparison between Dot Area Percentage Calculated in Accordance with the Tonal Conversion Method of This Invention and the Corresponding Dot Area Percentage Used in Actual Color Separation Work Conversion formula: $y = y_h + \dfrac{\alpha(1 - 10^{-kx})}{\alpha - \beta}(y_s - y_h)$ ($\alpha = 1.00000; 1/(1 - \beta) = \epsilon$)

Plate-making company: A Company
Scanner used: "CP-341ER" (manufactured by H Company)
S.G.S.: Standard gray step (made by E Company). Employed for the determination of the density at base density area.
Original density range: Base density range of original picture ($DR_o$): 2.24
Dot size range used: 5%–95% ($y_h = 5\%$, $y_s = 95\%$)
$DR_p$: Density range of printed picture

|  | Density of S.G.S. made by E Co. | Base density used for computing dot % (x) | Standard dot % of A Co. | | Dot area % computed by the "conversion formula" (y) | | | |
|---|---|---|---|---|---|---|---|---|
|  |  |  | Film original made by E Co. | Film original made by F Co. | Base density range 2.24 $DR_p = 1.10$ $\epsilon = 1.08629$ | Base density range 2.24 $DR_p = 1.05$ $\epsilon = 1.09785$ | Base density range 2.24 $DR_p = 1.00$ $\epsilon = 1.11111$ | Base density range 2.24 $DR_p = 0.95$ $\epsilon = 1.12638$ |
| 1 | 0.42 | 0.00 | 5.00 | 4.00 | 5.0000 | 5.0000 | 5.0000 | 5.0000 |
| 2 | 0.53 | 0.11 | 15.00 | 14.00 | 16.4344 | 16.0614 | 15.6921 | 15.3251 |
| 3 | 0.62 | 0.20 | 24.00 | 24.00 | 24.7870 | 24.1841 | 23.5829 | 22.9857 |
| 4 | 0.74 | 0.32 | 34.00 | 34.00 | 34.6820 | 33.8569 | 33.0319 | 32.2068 |
| 5 | 0.86 | 0.44 | 43.00 | 44.00 | 43.3209 | 42.3546 | 41.3834 | 40.4082 |
| 6 | 1.00 | 0.58 | 51.00 | 51.00 | 52.0242 | 50.9729 | 49.9103 | 48.8375 |
| 7 | 1.13 | 0.71 | 56.00 | 57.00 | 58.9607 | 57.8896 | 56.8007 | 55.6971 |
| 8 | 1.27 | 0.85 | 63.00 | 63.00 | 65.3742 | 64.3291 | 63.2611 | 62.1728 |

TABLE 4-continued

| | | | | | | | | |
|---|---|---|---|---|---|---|---|---|
| 9 | 1.45 | 1.03 | 69.00 | 69.00 | 72.2601 | 71.2998 | 70.3119 | 68.2978 |
| 10 | 1.64 | 1.22 | 77.00 | 77.00 | 78.1578 | 77.3270 | 76.4661 | 75.5766 |
| 11 | 1.87 | 1.45 | 82.00 | 81.00 | 83.7932 | 83.1480 | 82.4741 | 81.7721 |
| 12 | 2.08 | 1.66 | 86.00 | 84.00 | 87.8034 | 87.3378 | 86.8477 | 86.3337 |
| 13 | 2.25 | 1.83 | 88.00 | 87.00 | 90.4201 | 90.0985 | 89.7228 | 89.3991 |
| 14 | 2.41 | 1.99 | 91.00 | 90.00 | 92.4633 | 92.2727 | 92.0696 | 91.8546 |
| 15 | 2.50 | 2.08 | 93.00 | 91.00 | 93.4602 | 93.3404 | 93.2122 | 93.0763 |
| 16 | 2.62 | 2.20 | 95.00 | 94.00 | 94.6410 | 94.6118 | 94.5801 | 94.5467 |
| 17 | 2.73 | 2.31 | 97.00 | 96.00 | 95.5912 | 95.6412 | 95.6931 | 95.7876 |
| 18 | 2.73 | 2.31 | 96.00 | 95.00 | 95.5912 | 95.6412 | 95.6931 | 95.7876 |
| 19 | 2.66 | 2.24 | 95.00 | 94.00 | 95.0002 | 95.0001 | 94.9999 | 94.9999 |
| 20 | — | — | — | — | — | — | — | — |

Note:
(i) Base density (x) for the computation of dot area percentages = [Density at a given control point in the S.G.S. made by E Company] − [Density of the brightest area in the S.G.S. made by E Company (0.42)]

(ii) $DR_p$ is determined by a printing ink used. In Table 1, the densities of solid areas in proofs printed respectively with 4 types of commercial yellow inks were employed. Values $\beta$ were determined based on the densities of the solid areas respectively.

(iii) k value: $DR_p/DR_o$

TABLE 5

Comparison between Dot Area Percentage Calculated in Accordance with the Tonal Conversion Method of This Invention and the Corresponding Dot Area Percentage Used in Actual Color Separation Work Conversion formula: $y = y_h + \dfrac{(1 - 10^{-kx})}{\alpha - \beta} (y_s - y_h)$ $(\alpha = 1.00000; 1/(1 - \beta) = \epsilon)$ Plate-making company: D Company
Scanner used: "SG-808" (manufactured by D Company)
S.G.S.: Standard gray step (made by E Company)
Original density range: Base density range of original picture
($DR_o$): 2.27 and 2.35
Dot size range used: 4%–92% and 4%–95% ($y_h$  $y_s$)
$DR_p$: Density range of printed picture

| | Density of S.G.S. made by E Co. | Base density used for computing dot % (x) | Standard dot % of A Co. | | Dot area % computed by the "conversion formula" (y) | | | |
|---|---|---|---|---|---|---|---|---|
| | | | | | Base density range 2.27 | | Base density range 2.35 | |
| | | | Film original made by E Co. | Film original made by F Co. | $DR_p = 1.10$ $\epsilon = 1.08629$ | $DR_p = 1.00$ $\epsilon = 1.11111$ | $DR_p = 1.05$ $\epsilon = 1.09785$ | $DR_p = 0.95$ $\epsilon = 1.12638$ |
| 1 | 0.41 | 0.00 | 4.00 | 4.00 | 4.0000 | 4.0000 | 4.0000 | 4.0000 |
| 2 | 0.53 | 0.12 | 15.00 | 16.00 | 15.97958 | 15.20591 | 15.60299 | 14.83302 |
| 3 | 0.64 | 0.23 | 23.00 | 24.00 | 25.63730 | 24.34610 | 25.05131 | 23.75447 |
| 4 | 0.77 | 0.36 | 31.00 | 33.00 | 35.62311 | 33.91212 | 34.92274 | 33.18531 |
| 5 | 0.90 | 0.49 | 40.00 | 42.00 | 44.26061 | 42.29635 | 43.55839 | 41.54130 |
| 6 | 1.05 | 0.64 | 48.00 | 52.00 | 52.78808 | 50.69174 | 52.18811 | 50.00650 |
| 7 | 1.19 | 0.78 | 53.00 | 57.00 | 59.55713 | 57.45486 | 59.12541 | 56.90909 |
| 8 | 1.32 | 0.91 | 59.00 | 62.00 | 64.96298 | 62.93057 | 64.73119 | 62.56119 |
| 9 | 1.48 | 1.07 | 66.00 | 68.00 | 70.62500 | 68.75030 | 70.67673 | 68.64123 |
| 10 | 1.67 | 1.26 | 73.00 | 73.00 | 76.15901 | 74.53978 | 76.57649 | 74.77828 |
| 11 | 1.87 | 1.46 | 78.00 | 79.00 | 80.84619 | 79.54110 | 81.65876 | 80.16678 |
| 12 | 2.06 | 1.65 | 82.00 | 82.00 | 84.42759 | 83.43902 | 85.66860 | 84.43552 |
| 13 | 2.28 | 1.83 | 86.00 | 85.00 | 87.18716 | 86.49948 | 88.70151 | 87.83940 |
| 14 | 2.41 | 2.00 | 89.00 | 88.00 | 89.33073 | 88.91941 | 91.14092 | 90.57058 |
| 15 | 2.50 | 2.10 | 91.00 | 90.00 | 90.41427 | 90.15973 | 92.38875 | 91.98648 |
| 16 | 2.65 | 2.24 | 93.00 | 91.00 | 91.74178 | 90.68542 | 93.93347 | 93.75985 |
| 17 | 2.76 | 2.35 | 95.00 | 93.00 | 92.64869 | 92.76202 | 95.00037 | 94.99983 |
| 18 | 2.76 | 2.35 | 95.00 | 93.00 | 92.64869 | 92.76202 | 95.00037 | 94.99983 |
| 19 | 2.68 | 2.27 | 92.00 | 92.00 | 92.00026 | 91.99912 | 94.23652 | 94.11071 |
| 20 | — | — | — | — | — | — | — | — |

TABLE 6

Relationship among Printed Picture Density Range, Original Picture Control Point, Base Density and Dot Area Percentage when Dot Size Range of 5%-95% Is Used.

Conversion formula: $y = y_h + \frac{\alpha(1 - 10^{-kx})}{\alpha - \beta}(y_s - y_h)$ $(\alpha/\alpha - \beta$ will be designated by $\epsilon)$

- x: Base density of each control point
- y: Dot area percentage
- $Y_h$: Smallest dot (5%) to be applied to the high-light area of a picture to be printed.
- $y_s$: Largest dot (95%) to be applied to the shadow area of a picture to be printed.
- $\alpha$: Whiteness (reflectivity) of printing paper ($\alpha = 100\%$ in this table)
- $\beta$: Surface reflectivity of printing ink
- ( ): Base density at each control point

| Density range of printed picture$_{(\epsilon)}$ | H 0/8 | 1/8 | M₂ 2/8 | 3/8 | M₁ 4/8 | 5/8 | 6/8 | 7/8 | S 8/8 |
|---|---|---|---|---|---|---|---|---|---|
| 1.40 | (0.000) | (0.175) | (0.350) | (0.525) | (0.700) | (0.875) | (1.050) | (1.225) | (1.400) |
| (1.04146) | 5.00 | 36.08 | 56.86 | 70.75 | 80.03 | 86.23 | 90.38 | 93.15 | 95.00 |
| 1.35 | (0.000) | (0.169) | (0.338) | (0.506) | (0.675) | (0.844) | (1.013) | (1.181) | (1.350) |
| (1.04676) | 5.00 | 35.37 | 55.95 | 69.78 | 79.29 | 85.72 | 90.06 | 93.00 | 95.00 |
| 1.30 | (0.000) | (0.163) | (0.325) | (0.488) | (0.650) | (0.813) | (0.975) | (1.138) | (1.300) |
| (1.05276) | 5.00 | 34.65 | 54.92 | 68.95 | 78.53 | 85.17 | 89.71 | 92.85 | 95.00 |
| 1.25 | (0.000) | (0.156) | (0.313) | (0.469) | (0.625) | (0.781) | (1.938) | (1.094) | (1.250) |
| (1.05958) | 5.00 | 33.78 | 53.98 | 67.97 | 77.75 | 84.57 | 89.36 | 92.68 | 95.00 |
| 1.20 | (0.000) | (0.150) | (0.300) | (0.450) | (0.600) | (0.750) | (1.900) | (1.050) | (1.200) |
| (1.06734) | 5.00 | 33.05 | 52.92 | 66.98 | 76.93 | 83.98 | 88.97 | 92.50 | 95.00 |
| 1.15 | (0.000) | (0.144) | (0.288) | (0.431) | (0.575) | (0.719) | (0.863) | (1.006) | (1.500) |
| (1.07619) | 5.00 | 32.33 | 51.95 | 65.95 | 76.08 | 83.36 | 88.57 | 92.30 | 95.00 |
| 1.10 | (0.000) | (0.138) | (0.275) | (0.413) | (0.550) | (0.688) | (0.825) | (0.963) | (1.100) |
| (1.08629) | 5.00 | 31.61 | 50.86 | 64.99 | 75.21 | 82.71 | 88.14 | 92.12 | 95.00 |
| 1.05 | (0.000) | (0.131) | (0.263) | (0.344) | (0.525) | (0.656) | (0.788) | (0.919) | (1.050) |
| (1.09785) | 5.00 | 30.73 | 49.88 | 63.92 | 74.31 | 81.99 | 87.71 | 91.90 | 95.00 |
| 1.00 | (0.000) | (0.125) | (0.250) | (0.375) | (0.500) | (0.625) | (0.750) | (0.875) | (1.000) |
| (1.11111) | 5.00 | 30.01 | 48.77 | 62.83 | 73.38 | 81.29 | 87.22 | 91.66 | 95.00 |
| 0.95 | (0.000) | (0.119) | (0.238) | (0.356) | (0.475) | (0.594) | (0.713) | (0.831) | (0.950) |
| (1.12638) | 5.00 | 29.30 | 47.77 | 61.71 | 72.42 | 80.56 | 86.74 | 91.41 | 95.00 |
| 0.90 | (0.000) | (0.113) | (0.225) | (0.338) | (0.450) | (0.563) | (0.675) | (0.788) | (0.900) |
| (1.14402) | 5.00 | 28.59 | 46.63 | 60.68 | 71.43 | 79.80 | 86.20 | 91.19 | 95.00 |
| 0.85 | (0.000) | (0.106) | (0.213) | (0.319) | (0.425) | (0.531) | (0.638) | (0.744) | (0.850) |
| (1.16449) | 5.00 | 27.70 | 45.63 | 59.53 | 70.41 | 78.94 | 85.68 | 90.91 | 95.00 |
| 0.80 | (0.000) | (0.001) | (0.200) | (0.300) | (0.400) | (0.500) | (0.600) | (0.700) | (0.800) |
| (1.16449) | 5.00 | 27.70 | 45.63 | 59.53 | 70.41 | 78.94 | 85.68 | 90.91 | 95.00 |
| 0.75 | (0.000) | (0.094) | (0.188) | (0.281) | (0.375) | (0.469) | (0.563) | (0.656) | (0.750) |
| (1.21629) | 5.00 | 26.30 | 43.46 | 57.15 | 68.30 | 77.29 | 84.52 | 90.30 | 95.00 |
| 0.70 | (0.000) | (0.088) | (0.175) | (0.263) | (0.350) | (0.438) | (0.525) | (0.613) | (0.700) |
| (1.24926) | 5.00 | 25.62 | 42.29 | 56.07 | 67.21 | 76.42 | 83.87 | 90.02 | 95.00 |
| 0.65 | (0.000) | (0.081) | (0.163) | (0.244) | (0.325) | (0.406) | (0.488) | (0.569) | (0.650) |
| (1.28845) | 5.00 | 24.73 | 41.29 | 54.84 | 66.09 | 75.43 | 83.26 | 89.67 | 95.00 |
| 0.60 | (0.000) | (0.075) | (0.150) | (0.225) | (0.300) | (0.375) | (0.450) | (0.525) | (0.600) |
| (1.33545) | 5.00 | 24.06 | 40.10 | 53.60 | 64.95 | 74.50 | 82.54 | 89.31 | 95.00 |
| 0.55 | (0.000) | (0.069) | (0.138) | (0.206) | (0.275) | (0.344) | (0.413) | (0.481) | (0.550) |
| (1.39244) | 5.00 | 23.41 | 39.11 | 52.33 | 63.79 | 73.56 | 81.90 | 88.92 | 95.00 |
| 0.50 | (0.000) | (0.063) | (0.125) | (0.188) | (0.250) | (0.313) | (0.375) | (0.438) | (0.500) |
| (1.46248) | 5.00 | 22.77 | 37.92 | 51.25 | 62.61 | 72.60 | 81.12 | 88.61 | 95.00 |

We claim:

1. A photomechanical apparatus suitable for use in the production of a printing plate, which is adapted to print a halftone picture corresponding to an original continuous-tone picture, on the basis of pictorial information signals obtained by photoelectrically scanning the original continuous-tone picture, comprising a tonal conversion system for converting the pictorial information signals in such a way that the base density (x) of a desired control point on the original continuous-tone picture and the halftone intensity (y) of a corresponding control point on the picture to be reproduced are correlated in accordance with the following formula (1):

$$y = y_h + \frac{\alpha(1 - 10^{-kx})}{\alpha - \beta}(y_s - y_h) \quad (1)$$

where

- x: the base density of the desired control point on the original continuous-tone picture, namely, a value obtained by subtracting the density at the brightest area of the original continuous-tone picture from the density at the desired control point of the original continuous-tone picture;
- y: the halftone intensity of the corresponding control point on the picture to be reproduced;
- $y_h$: a desired halftone intensity set for the brightest area of the picture to be reproduced;

$y_s$: a desired halftone intensity set for the darkest area of the picture to be reproduced;

$\alpha$: the reflectivity of a base material on which the halftone picture is to be reproduced;

$\beta$: the surface reflectivity of a medium for visualizing the halftone picture; and k: the ratio of the density range of the halftone picture to be reproduced to the density range of the original continuous-tone picture.

2. The apparatus as claimed in claim 1, wherein the halftone intensities (y), ($y_h$) and ($y_s$) are each expressed in terms of dot area percentage.

3. The apparatus as claimed in claim 1, wherein the halftone picture to be printed is a monochrome halftone picture.

4. The apparatus as claimed in claim 1, wherein the halftone picture to be printed is a multi-color halftone picture.

5. The method as claimed in claim 1, wherein the visualizing medium is an ink.

6. The method as claimed in claim 1, wherein the base material is a paper sheet.

* * * * *